United States Patent
Edwards et al.

(10) Patent No.: US 6,594,686 B1
(45) Date of Patent: Jul. 15, 2003

(54) OBTAINING USER RESPONSES IN A VIRTUAL EXECUTION ENVIRONMENT

(75) Inventors: Jonathan Edwards, Hillsboro, OR (US); Edmund White, Beaverton, OR (US)

(73) Assignee: Network Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/517,133

(22) Filed: Mar. 2, 2000

(51) Int. Cl.[7] .................. G06F 15/16; G06F 15/173; G06F 11/30; H04L 1/22; H05K 10/00
(52) U.S. Cl. .................. 709/203; 709/219; 709/223; 709/225; 709/227; 713/201; 714/38; 714/39; 714/48; 714/49
(58) Field of Search .................. 709/203, 217, 709/218, 219, 223, 224, 225, 229; 713/201; 714/38, 39, 48, 49

(56) References Cited

U.S. PATENT DOCUMENTS

| | | | | |
|---|---|---|---|---|
| 5,623,600 A | * | 4/1997 | Ji et al. | 395/187.01 |
| 5,960,170 A | * | 9/1999 | Chen et al. | 395/183.14 |
| 6,006,034 A | * | 12/1999 | Heath et al. | 395/712 |
| 6,026,437 A | * | 2/2000 | Muschett et al. | 709/219 |
| 6,029,256 A | * | 2/2000 | Kouznetsov | 714/38 |
| 6,085,249 A | * | 7/2000 | Wang et al. | 709/229 |
| 6,094,731 A | * | 7/2000 | Waldin et al. | 714/38 |
| 6,119,165 A | * | 9/2000 | Li et al. | 709/229 |
| 6,266,774 B1 | * | 7/2001 | Sampath et al. | 713/201 |
| 6,269,456 B1 | * | 7/2001 | Hodges et al. | 714/38 |
| 6,347,375 B1 | * | 2/2002 | Reinert et al. | 713/200 |
| 6,421,733 B1 | * | 7/2002 | Tso et al. | 709/246 |
| 6,427,149 B1 | * | 7/2002 | Rodriguez et al. | 707/10 |

* cited by examiner

*Primary Examiner*—Dung C. Dinh
*Assistant Examiner*—Marlon Johnson
(74) *Attorney, Agent, or Firm*—Blakely, Sokoloff, Taylor & Zafman LLP; Christopher J. Hamaty, Esq.

(57) ABSTRACT

The invention provides for on-access scanning of archives, such as "ZIP" files, for files containing viruses or other unwanted characteristics. In particular, disclosed are various techniques for beginning a scanning operation, and then monitoring the scanning operation to determine whether it is completing in a reasonable time. If the scanning operation is taking place within a terminal server type of environment, such as the Microsoft Terminal Server, where an application program is run in a virtual execution environment, then provision is made to identify client connections to the server so that error messages (such as denying file access due to a virus) can be presented to a terminal server client's terminal, rather than at the terminal server console.

20 Claims, 7 Drawing Sheets

OBTAINING USER RESPONSES IN A VIRTUAL EXECUTION ENVIRONMENT

FIELD OF THE INVENTION

The invention generally relates to monitoring for problems arising from a user's execution of a shared application, where the shared application executes on a server and consequently presents error messages on the server and not to the user, where the invention identifies client-server session data to allow the invention to directly interact with the user as needed.

BACKGROUND

Traditional virus scanners provide off-access virus scanning, e.g., a file is scanned when it is not in use. Typically scanning is performed at an off-peak time, such as during the night, when it is most likely that all files will be available for review by the scanning software. Unfortunately, the advent of fast Internet connection, and the proliferation of computers in the workplace and home, allows users to obtain and share files much faster than the traditional virus scanners can scan and correct viruses. Consequently, off-peak scanning services are no longer sufficient.

To compensate, on-access scanning has been developed. In on-access scanning, as the name suggests, a file is scanned when access is attempted to the file. This scanning may be performed along with traditional scanning services. On-access scanning operates by configuring an operating system (or equivalent control program) to notify the on-access software when a file access attempt is made. For example, file access subroutines of the operating system may be replaced with specialized versions tailored to interact with the on-access scanning software. Or, in an event driven environment, the operating system (or equivalent event-control structure) can be instructed to route file access events to the scanning software. In either configuration (or equivalents), file access attempts are effectively intercepted by the scanning software to provide an opportunity to scan the file for viruses before a file requestor obtains access to the file.

Unfortunately, there are several problems with on-access scanning. One such problem is the balancing of security needs against causing file-access errors or otherwise overly-delaying access to a file. For security, a file should be scanned before being released to a requester. Since file access attempts are intercepted, a user requesting the file must therefore wait for scanning to complete before access is granted. If the wait is too long, the user may believe that there has been a software and/or hardware malfunction. Similarly, if the requestor is another program, the program may believe there has been some sort of input/output (I/O) or other error.

Generally, long delays are atypical. Current techniques for scanning files, e.g., checking file components for "signatures" of viruses, usually takes only a fraction of a second—a time span not noticeable by most users or other devices/programs seeking to access the file. But, if the file is an archive, then scanning may be significantly longer, since the contents may have to be scanned, as well as the archive itself (it might be a self-executing self-extracting archive).

For some file constructions, inspecting the archive may take a very long time. Since file access is contingent on completing the scan, access to the file is completely blocked. And, depending on the construction of the virus scanning system, all of the scanner's resources may be tied up in processing one or more archives, thus rendering the entire system unavailable for processing file access requests. In fact, rather than trying to sneak a virus past a virus scanner, some scurrilous folks have been known to mount denial of service (DoS) attacks against computing systems by intentionally presenting archives crafted to take an inordinate amount of time to scan, and also consume most or all scanning resources, thus leaving the system inoperable.

File access scanning issues are further exacerbated when the virus scanner is running on a terminal server type of environment, e.g., the Microsoft Terminal Server, where the environment tricks a program into being shared among multiple client connections with the terminal server by executing each instance of the shared application program in a virtual execution environment. Because the shared application program is unaware of the sharing, when an error arises, the application issues an error to the executing host. Normally this would be the user's computing system. However, in a terminal server environment, it is instead the server, thus errors are displayed to the wrong computing device.

SUMMARY

The invention provides for an unshared application program, operating in a terminal server type of environment, to determine client session characteristics for a client connection with a server so as to allow the unshared application to notify the client as needed. In one configuration, the unshared application is a virus scanner performing on-access scanning of files, and determining client session characteristics allows the virus scanner to notify the client of a problem with a file and possibly seek a disposition for the file from the client.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Figure 1:
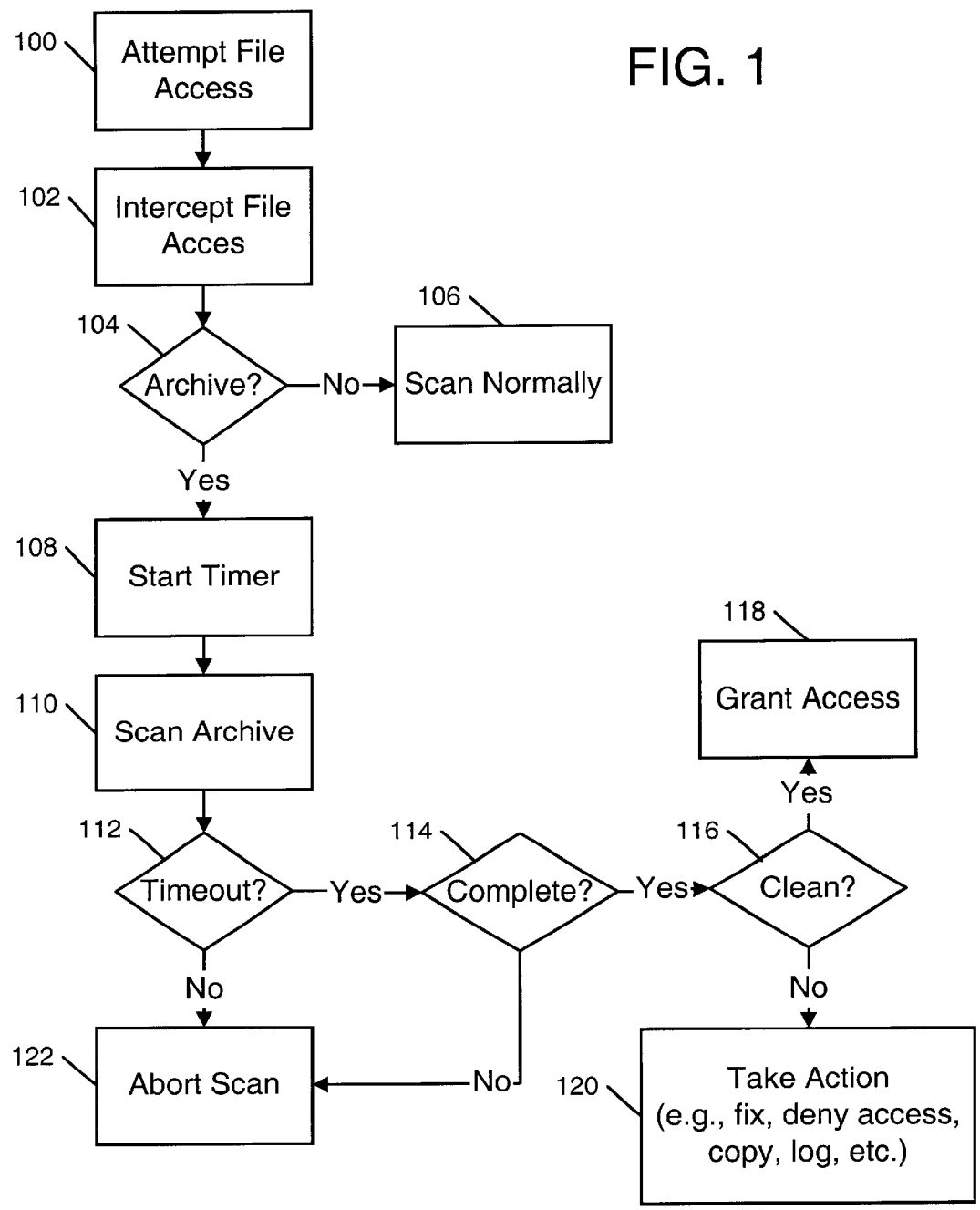
FIG. 1 illustrates a high-level flowchart of scanning a file.

FIG. 1 is a high-level flowchart of scanning a file, such as an archive, for viruses. As used in the description and claims that follow, an archive is a file that contains one or more files embedded therein. Typically, the archive stores the embedded data files in a compressed format, and therefore it is necessary to decompress the archive (partially or completely) in order to test each of the embedded archive files for viruses.

As illustrated, an initial event is attempting to access 100 a particular file. The particular file may be located on a file server, with a client's access attempt detected by virus services running on the server. Or, the file may be stored local to some computing device, with the access detected by local virus services executing on the computing device. The access attempt is then intercepted 102.

Figure 2:
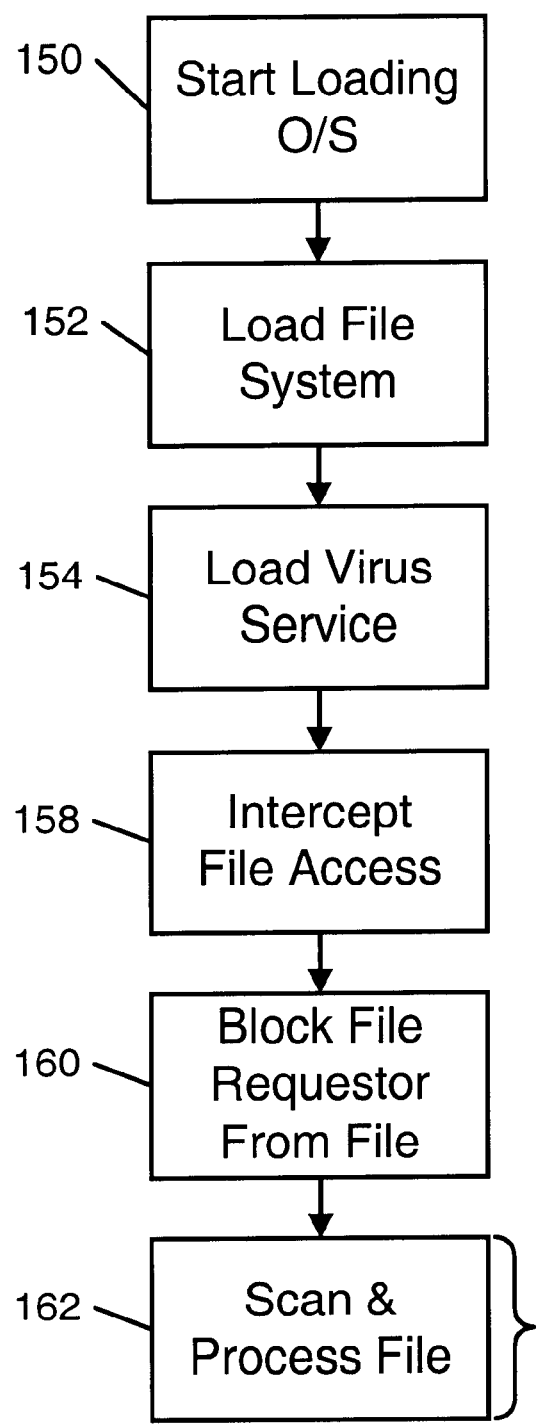
FIG. 2 illustrates one embodiment for loading a virus scanner service, during booting of an operating system, for intercepting file access attempts.

It will be appreciated that the particular manner of the intercepting depends on the configuration of the file system storing the file, and of the operating system or other controlling software governing access to files stored within the file system. It is assumed interception provides the identity of the file being accessed, and that a requestor cannot obtain file access until permitted by the virus service. FIG. 2 illustrates one exemplary method for loading a virus scanning system to intercept file accesses.

After interception, a test is performed to determine if 104 the file being accessed is an archive. If the file is not an archive, it is scanned normally 106, e.g., using known scanning techniques. However, if the file is an archive, then a timer is started 108 and the is archive scanned 110 for viruses. But, because the archive can take a very long time to process, the virus scanner will periodically check if 112 the timer has exceeded a certain timeout value, such as 5 seconds. It will be appreciated that the timeout value can be determined by one or more or a combination of several factors, such as a default virus scanner value, user setting, type of file system, access pathway (e.g., a networked resource may require longer timeouts), file type (e.g., a known "hard" to decompress archive), and the like.

If the timer has not exceeded the timeout value, a subsequent check can be made to determine if 114 scanning is completed. If scanning is complete, a check is made to determine if 116 the requested file is clean. If the file had no detectable viruses, then the requester is granted access 118 to the file. If the file had a detected virus, then action is required to be taken 120. In one embodiment, access is generally granted or denied for an archive, and therefore access is generally denied if at discovery of a first virus within the archive. In one embodiment, a user is prompted with a message box giving details concerning the virus, and requesting the user to determine a disposition for the file. For an archive, a user may elect whether to repair the virus within the archive and continue scanning the archive. In one embodiment, the virus scanning service attempts to automatically fix (e.g., remove) the virus, and only grants access to the file if the virus was successfully removed. In a server embodiment, where a user of a client workstation attempts to access a file on the server, the server's virus service logs the virus problem to a local virus service log or to a system log, and causes a pop-up notification to the user (if a real user and not another program or service) requesting the user to determine a disposition for the file.

If 114 scanning is not yet complete, then scanning 110 the archive continues. Note that although depicted as a linear program progression, it will be appreciated that the scanning 110 and checking 112 operations can be implemented as asynchronous functions operating independently of one another, while maintaining communication through known techniques for inter-process communication. Thus, if 112 the timeout has been exceeded, then the scanning is aborted 122. In an asynchronous operation, the timer would send the virus scanner a message to cancel the scanning operation.

More information regarding virus scanning can be found at Internet location http://www+nai+com/asp_set/buy_try/try/whitepapers+asp. The contents of this web site are incorporated herein by reference as of the date of filing the present application. (Please note: to avoid the preceding uniform resource locator (URL) being interpreted as a valid live-link within patent databases, all periods within the URL have been replaced with plus "+" symbols.)

FIG. 2 is a flowchart exemplifying loading a virus scanner service, during booting of an operating system, for intercepting file access attempts. It is assumed that file access is attempted by a requestor, which may be a person/user, or a hardware or software component of a computing device. However, it will be appreciated that this discussion is applicable to on-access scanners in other contexts. For example, rather than an operating system service, a scanner may be integrated with an E-mail server to scan E-mail messages in their entirety as they are received, where scanning identifies an archive attachment for an E-mail message.

As illustrated, an initial operation is to start 150 the loading process for an operating system. Operating systems include mainstream operating systems such as Windows, Macintosh, BeOs, Linux, Unix, etc., as well as dedicated operating systems for specialized devices, such as for handled devices, personal digital assistants (PDSa), and the like.

Loading an operating system essentially works by successively loading programs having increasing functionality an abilities. Typically, a computing device contains basic input/output (BIOS) (or equivalent) routines that are executed after performing a power-on self-test (POST) of the computing device. The BIOS reads the contents of a boot device (e.g., a hard drive, floppy disk, CD-ROM, etc.), and transfers processing control to a program stored in the boot device's Master Boot Record (MBR). The MBR code inspects the boot device to identify partitions defined for the boot device, and determines an "active" partition containing a boot sector program, or boot image, for the operating system that is stored on the boot device. At this point in the boot process, any operating system may be loaded.

For the purposes of this figure, assume a system utilizing the Windows NT operating system by Microsoft of Redmond, Wash. Thus, the boot sector program loads the Windows NT Loader (NTLDR) program. NTLDR provides for loading NT and non-NT operating systems. Assuming booting into NT, NTLDR loads memory support, places the processor in protected mode (if applicable), inspects the hardware configuration of the system (e.g., via NTDETECT) and loads system drivers for software and hardware devices used in the system. After all drivers are loaded, the operating system graphical user interface (GUI) is loaded.

While loading the drivers, drivers for the operating system's file system are loaded 152. Drivers for a virus scanning service are also loaded 154. However, as discussed above, the virus scanning service is configured so that all file access requests are routed through the service, allowing the service to allow or deny access to a requested file based on its inspection of the file.

Windows NT controls file handling through use of packet-based input/output (I/O), and the virus scanner installs itself 154 as the default destination for all I/O packets. An I/O packet is only passed to Windows NT after a successful scan of the requested file. In this way, a requestor's file accesses can be intercepted 158 and 160 blocked pending scanning 162 for viruses.

Figure 3:
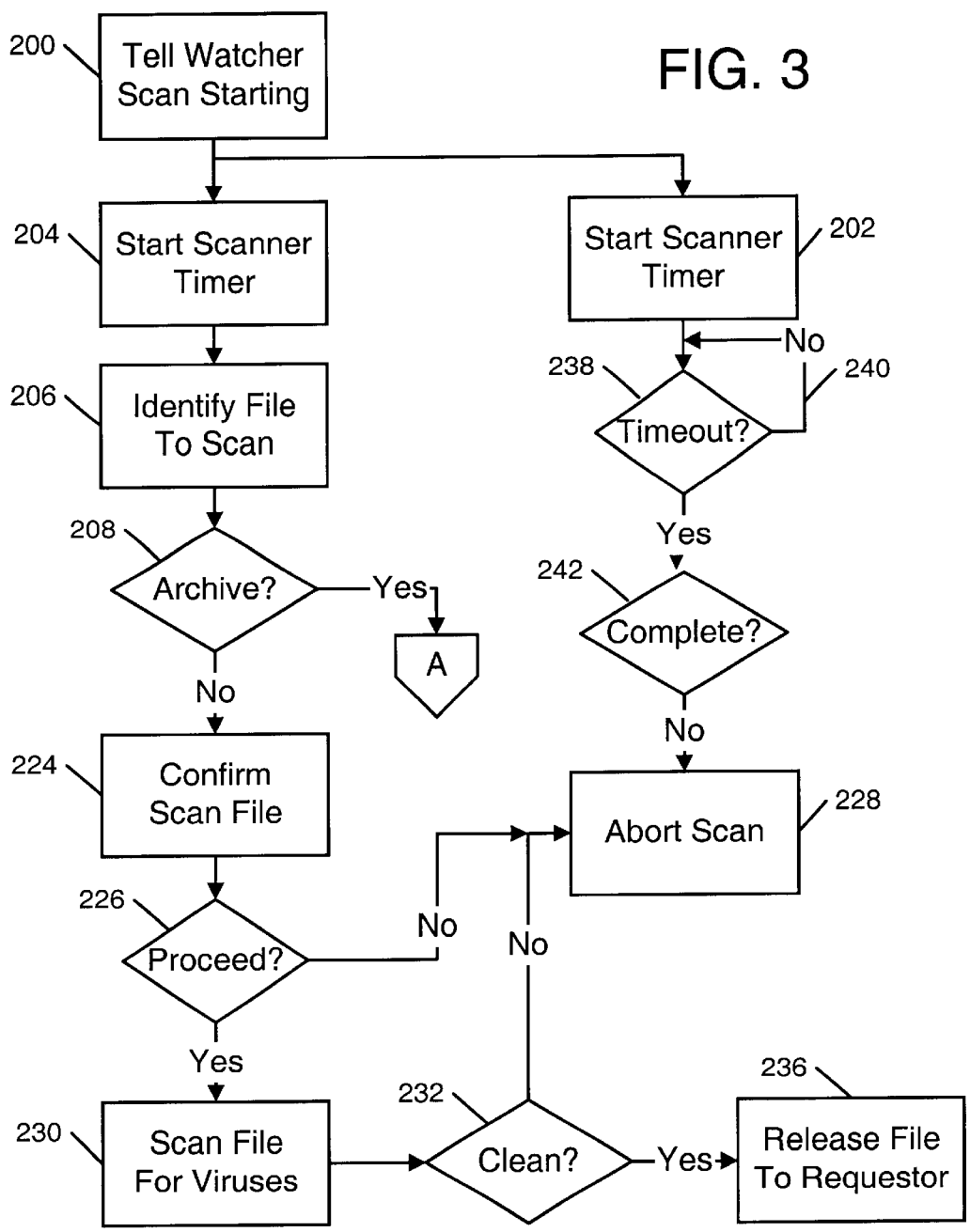
FIG. 3 illustrates another embodiment for FIG. 1 virus scanning.

FIG. 3 is a flowchart illustrating a more detailed embodiment of FIG. 1. In this embodiment, scanning for viruses is performed with three separate scanning components operating asynchronously to each other. The first component is the virus scanning service that intercepts files accesses (e.g., FIG. 2 item 158). The second component is the virus scanning application that performs the actual inspection of a particular chunk of data, e.g., a file or portion thereof, memory region, etc. The third component is a "watcher" that is responsible for ensuring that the second component does not take too long to return from scanning a particular file. (See FIG. 1 item 112 discussion above.) In multi-tasking environments, these components may be independent tasks or separate threads of execution.

Figure 4:
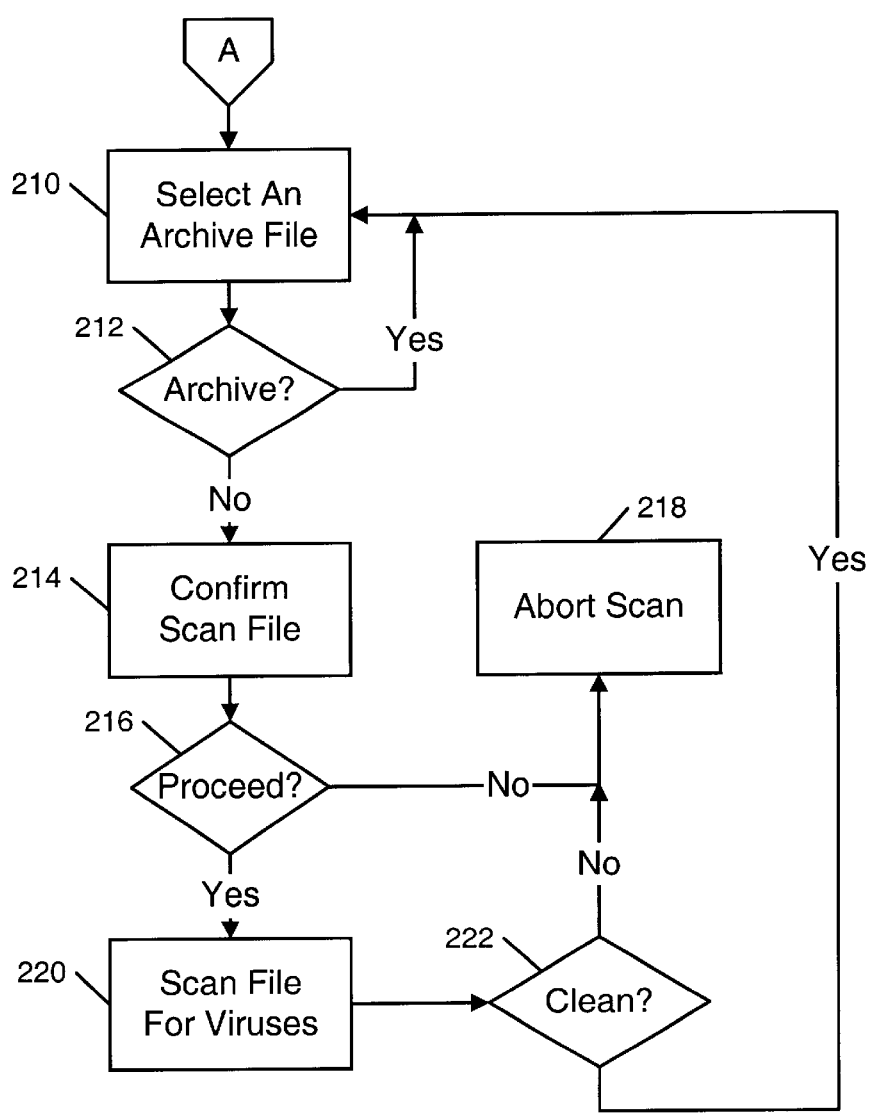
FIG. 4 illustrates scanning a file within an archive for viruses.

After a file access has been intercepted, a first operation is to tell 200 the watcher that a virus scan is to be commenced on a particular file. In response the watcher starts a watcher timer 202. In parallel, as discussed above for FIG. 1 item 108, a scanner timer is started 204. A check is made to identify 206 the type of file being accessed. If 208 the file is an archive, then processing continues with FIG. 4, where a file from the archive is selected 210 for scanning for viruses. A test is made to determine whether the selected file is also an archive, e.g., a sub-archive.

If 212 so, then recursive processing of the sub-archive occurs, and processing continues with item 210. When testing of the sub-archive is completed, or if the selected file was not an archive, processing continues with a confirmation 214 as to whether to scan the particular selected file. In one embodiment, confirmation is by way of the second component telling the first component that it is about to start scanning a particular file. The first component is then provided opportunity to decide if 216 scanning should proceed. If not, such as due to expiration of the scanner timer set at item 204, then scanning aborts 218. Although this exact handshaking is not required, some confirmation facilitates operation when the components are asynchronous. If 216 scanning proceeds, the second component scans 220 the selected file.

In one embodiment, the second component is a conventional scanning application program that can be directed to scan a particular file. The scanning application may be designed to remain resident in random access memory (RAM), or it may be configured to be loaded and unloaded as needed (to conserve resources between scans). Loading/unloading can be advantageous in restricted environments, such as handheld devices, where active memory resources are scarce. The scanning application may also be stored and/or executed from non-volatile memory, such as read-only memory (ROM), where temporary data storage is placed in volatile memory, such as RAM.

Note that in some operating systems, there may be a risk that requesting the scanning application to abort the scan will not work; for example the scanner may have become non-responsive, or an erroneous file lock is believed present even though the scanning application has in fact released the file. In such circumstances, to ensure the requestor obtains access, in one embodiment aborting includes canceling the process/execution thread of the scanning application so that it is forced to unload from system memory. Such termination of execution will cause an automatic release of all files deemed in use by the scanning application. In a further embodiment, if the scanning application is configured to remain in memory, then it is reloaded into memory for processing further scans. In a still further embodiment, on unloading the scanning application, a log saved of in-progress non-stalled scans, and such scans resumed on reloading the scanning application.

After scanning 220 the selected file from the archive, a test is performed to determine if 222 the selected file is clean, e.g., not appearing to harbor a virus. If the file is clean, then processing continues with the selection 210 of another file from the archive. But, if the file was not clean, then processing the archive aborts 218. Although not illustrated, it is expected that various actions will occur on finding a virus, such as actions discussed above for FIG. 1 item 120.

Continuing again with FIG. 3, if 208 the file was not an archive, then processing continues with receiving a confirmation 224 from the second component regarding whether the file should be scanned. As discussed above, the confirmation is expected to be sent from the second component actually performing the scanning, to the first component which is intercepting file accesses and coordinating the scanning. It will be appreciated that this handshaking may or may not be required depending on whether the scanning system employed uses separate components as herein.

If 226 scanning is not to proceed, such as due to expiration of the scanner timer, then scanning is aborted 228. If scanning is to proceed, then the file is scanned 230 for viruses. After scanning, a check is performed to determine if 232 the scanned file was clean. If not, then virus processing aborts 228, and as discussed previously, action is expected to be taken (e.g., prompting a user, logging, denying access, etc.) to how to handle the presence of a virus. If no virus was found, then the file is released 236 to the file's requestor. When the scan is complete, either after aborting or releasing the file, the third component, the watcher, is instructed to reset (not shown) its timer so that it does not erroneously signal a scanning timeout.

Recall that the initial operations 200, 202 are informing 200 the third component, the watcher, of starting a scan, and in response the watcher starts 202 its watcher timer. Unlike the FIG. 1 embodiment, the scanning 220, 230 performed in FIG. 3 and FIG. 4 does not inspect the scanner timer to determine if 112 the timer has exceeded its timeout. This is because the three components are operating independently, and therefore the variable containing the timer value for the first component is not (usually) available to the second component.

The watcher then performs a check to determine if 238 the watcher's timer has exceeded a timeout value, such as 1 minute, or some other value that can be determined on a case by case basis, by operating environment, etc. If the timeout value has not been exceeded, then processing loops back 240 for checking again. To avoid a tight loop that consumes too much processor time, a delay (not shown) can be used to slow down the checking. If the timeout has been exceeded, then a check is made to determine whether the scan of the file has been completed 242. If not, then the scan is taking too long, and the scanning application is instructed to abort 228.

As discussed in the background, there can be many reasons for the scanning timing out, from there being too many files in the archive, to the archive being intentionally constructed to be extremely long to process. Regardless of the cause, to forestall tying up system resources too long, a requestor can be prompted to an take an action, such as accept the file without further scanning attempts, or to continue scanning the file. In a multi-tasking environment having execution priorities, difficult-to-scan archives (or regular files) can be relegated to a low priority thread. Doing so allows the convenience of scanning all files, while allowing scanning to continue with other less-difficult files. In one embodiment, if the watcher times out, the file is simply returned to the requestor even if incompletely scanned, and a log entry and/or other notification made presented. In a further embodiment, incompletely scanned files are also placed on a low priority scanning thread to allow later verification of the safety of the incompletely scanned file.

In an alternate embodiment, there is no timeout loop 238. Some operating systems, such as Windows NT, provide for starting a task, and then putting it to sleep for a certain amount of time. Thus, instead of the loop, the watcher is put to sleep (e.g., it's process made inactive) for the prescribed timeout period. The watcher's thread is then either woken up at the completion of the file scan, or woken up at the expiration of that time period by the operating system (e.g., by the kernel). The watcher can then determine, on awakening, whether the timeout caused its revival. If due to the timeout, then the watcher instructs the scanning to abort.

It will be appreciated to one skilled in the art that a Microsoft Windows system registry, equivalent configuration database for other operating systems, or configuration files may be used to store various timeout values to be used in different circumstances. In one embodiment, these timeout values may be dynamically changed and read as needed, e.g., at the beginning of scans or at other appropriate times.

Figure 5:
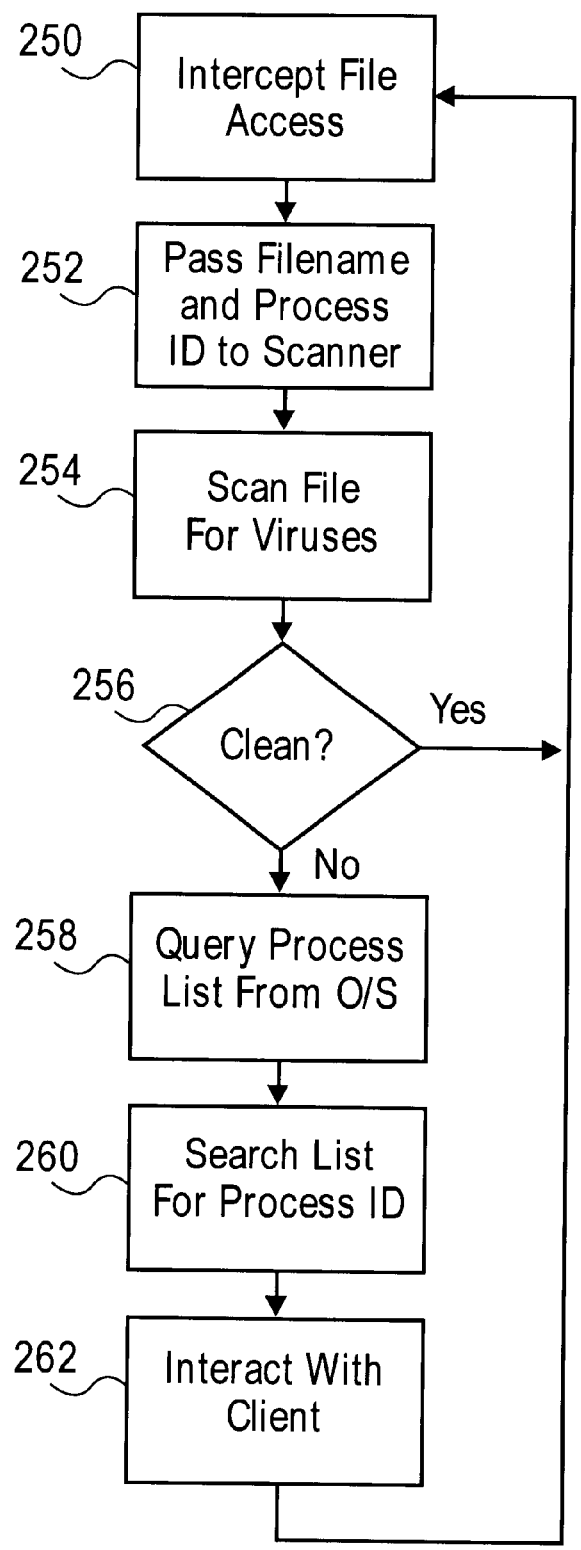
FIG. 5 illustrates communicating with a user over a network to obtain user preferences and confirmations.

FIG. 5 is a flowchart illustrating communicating between a user over a network, where the user is sharing an application program (hereafter "shared application") through a Microsoft Terminal Server or equivalent environment. The all lower-case phrase "terminal server" will be used herein to refer to the Microsoft Terminal Server environment and equivalent class of application program execution environments. In addition, it is assumed a secondary application program, different from the shared application, may occasionally require communication with the user. In one embodiment, the secondary application program is a virus scanner, and the occasional communication includes requesting disposition for a virus discovered in a file accessed by the shared application. However, it will be appreciated that the secondary application program may be any application program.

A significant limitation overcome by the illustrated embodiment is the difficulty in communicating with a user in terminal server and equivalent environments. A terminal server shares a non-terminal server specific application program by creating a virtual execution environment for the shared application's input/output with a client connection to the terminal server. The shared application is not aware that it is being shared. When a shared application encounters an error, it typically writes an error message to "standard error" and/or creates an entry in an error log. Unfortunately, since the shared application is executing on the terminal server, error notification is sent to the terminal server's console and/or system logs, not to the terminal server client.

Communication is further complicated for non-shared secondary application programs executing on the terminal server, such as a virus scanner, that may be interested in communicating with the user. Since such secondary applications are not being executed/shared by a user, there is no communication channel (not even a virtual one) for desired communication. Consequently, if an error arises out of an action taken by a user, such as directing the shared application to open a virus infected file, the virus scanner is not able to notify the user of the error. Instead, the virus scanner denies the shared application's attempted access to the infected file, and at best, the user receives an "access denied" error message from the shared application.

Assume the secondary application is a virus scanner. When a user directs the application program to access a file, a first operation is to intercept 250 the attempted file access so that the file may first be scanned before the shared application is allowed access to the file.

The requested file's name and associated process ID (e.g., the ID of the process requesting the file) is passed 252 to the secondary application program, e.g., the virus scanner. The requested file is then scanned 254 for viruses, and if 256 clean, e.g., the file did not appear to contain a virus, and scanning did not timeout (such as may occur with a complex archive), processing continues with intercepting 250 the next file access attempt.

If 256 the file was not clean, then the virus scanner queries 258 the terminal server environment for a process list. (Note that the Microsoft Terminal Server is considered to be the operating system.) This list contains session IDs (indicating ownership of a process), process IDs, terminal server IDs, process names, etc., for current terminal server sessions.

The virus scanner then searches 260 the list for the process ID passed 252 to it when the file was accessed. Based on this search, the virus scanner may determine the associated client session data (such as the client session ID). With this session data, the virus scanner can interact 262 with the client such as to display a message box (e.g., WinStationSendMessage( )) concerning a suspected virus or other error. In one embodiment, interaction includes receiving responses from the client, such as what action to take with respect to a virus.

As noted above, the secondary application need not be a virus scanner, and in fact, the illustrated techniques may be used by the terminal server to identify and communicate with client sessions based on the activities of a shared application program. (For example, the terminal server may determine the shared application is performing some task inefficiently and suggest the client/user to take action.) In one embodiment, messages sent to the client/user time out and a default action is taken if the client does not respond within the timeout period.

Figure 6:
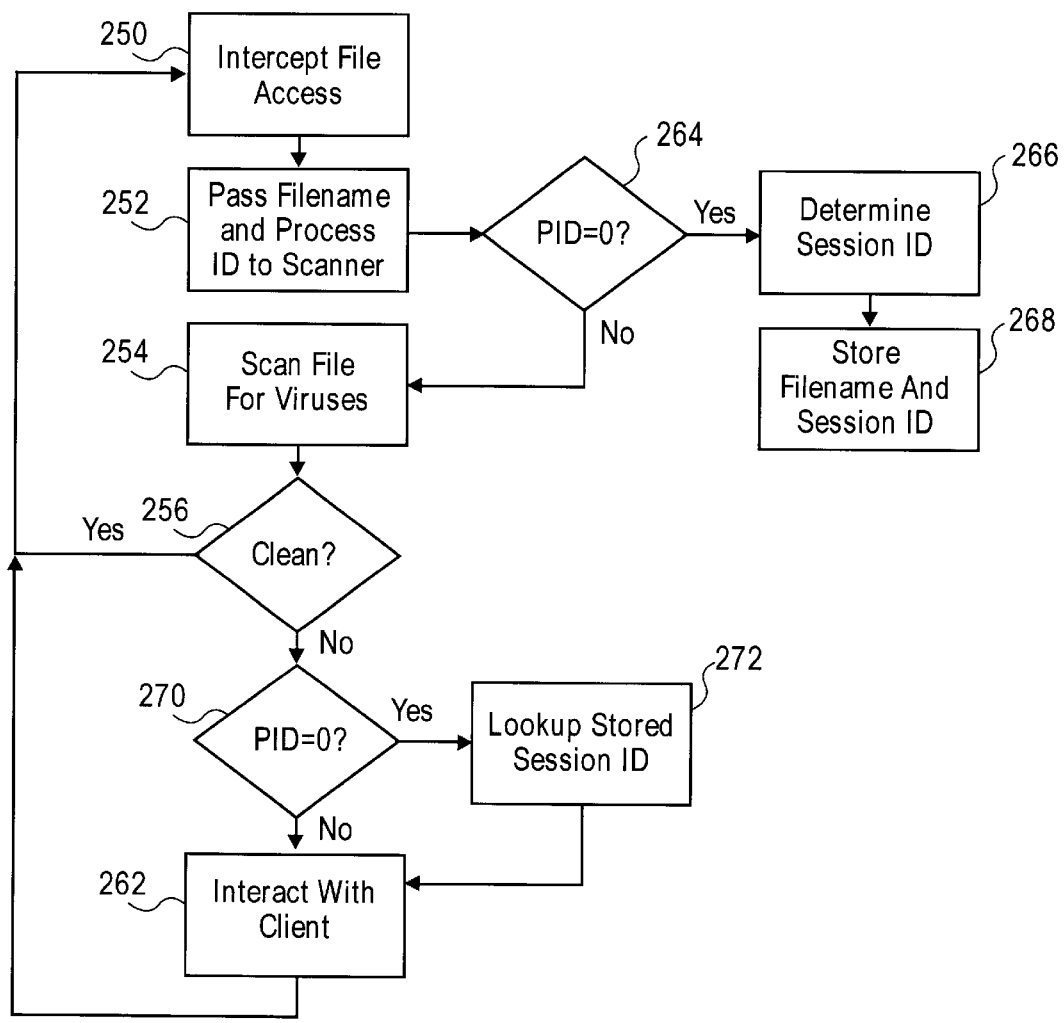
FIG. 6 illustrates a variation of the FIG. 5 embodiment.

FIG. 6 is a flowchart illustrates a variation of the FIG. 5 embodiment for communicating with a user over a network to obtain user preferences and confirmation. In this embodiment, the requested file does have an associated process identifier.

Such situations arise, for example, when the requested file is being scanned "on close," e.g., when a client has finished using the file. One common example is when a file is copied to the terminal server; at the completion of the write operation to the terminal server storage, the written file may be scanned for viruses (or otherwise operated on by the parallel application program).

Consequently, after intercepting 250 and passing 252 the file name and process ID as discussed above, if 264 the virus scanner receives an ID=0, then the virus scanner determines 266 the terminal server ID for the client associated with the file name. The terminal server ID identifies the communication session between a user and the terminal server, and is stored 268 so that the virus scanner can later interact 262 with the client if there is a problem with an accessed file. In one embodiment, as files are opened by a particular client, entries are made in a table to associate that client with the opened file. Thus, when a PID=0 is received, the appropriate client can later be identified from the table.

After determining the terminal server session ID, processing continues as discussed above for scanning 254 the file for viruses. If 256 the file is determined to be clean, then processing repeats for the next intercepted 250 file access.

If the file was not clean, then if 270 the PID=0, the stored session ID is looked up 272 and used to interact with the client. If the PID was not 0, then interaction can be achieved as discussed above (or, the stored terminal server ID can be used since it has already been computed).

Figure 7:
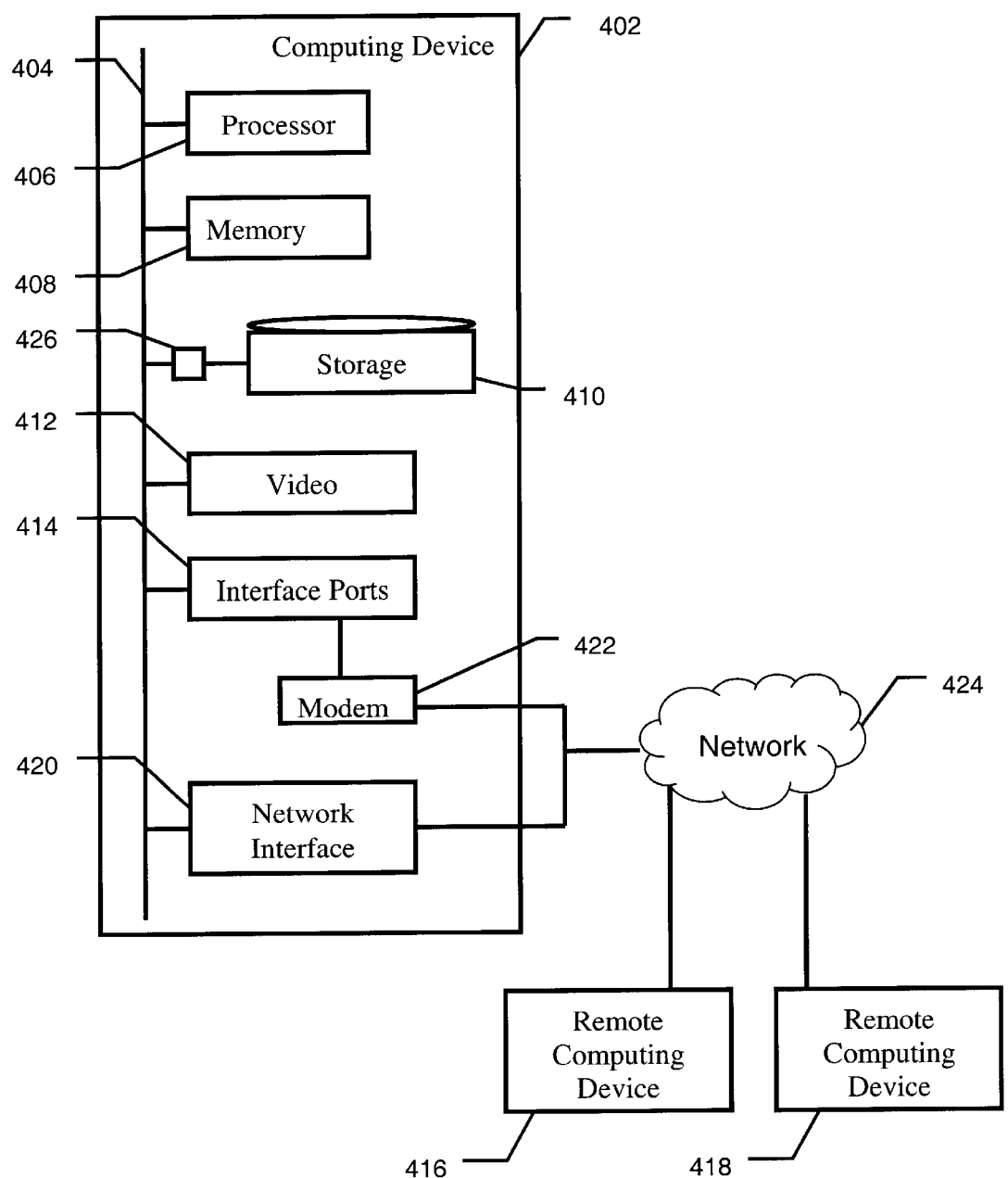
FIG. 7 illustrates a suitable computing environment in which certain aspects the claimed invention may be practiced.

FIG. 7 and the following discussion are intended to provide a brief, general description of a suitable computing environment in which portions of the invention may be implemented. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices.

An exemplary system for implementing the invention includes a computing device 402 having system bus 404 for coupling together various components within the computing device. The system 404 bus may be any of several types of bus structures, such as PCI, AGP, VESA, Microchannel, ISA and EISA, etc. Typically, attached to the bus 402 are processors 406 such as Intel, DEC Alpha, PowerPC, programmable gate arrays, etc., a memory 408 (e.g., RAM, ROM), storage devices 410, a video interface 412, input/output interface ports 414. The storage systems and associated computer-readable media provide storage of data and executable instructions for the computing device 402. Storage options include hard-drives, floppy-disks, optical storage, magnetic cassettes, tapes, flash memory cards, memory sticks, digital video disks, and the like. The computing device 402 is expected to operate in a networked environment using logical connections to one or more remote computing devices 416, 418 through a network interface 420, modem 422, or other communication pathway. Computing devices may be interconnected by way of a network 424 such as a local intranet or the Internet.

It is understood that a remote computing device can configured like computing device 402, and therefore may include many or all of the elements discussed for computing device 402. It should also be appreciated that remote computing devices 416, 418 may be embodied separately, or combined within a single device; for example, different device components and/or software may be operating within a single device, or communicatively-coupled but operating within separate devices.

Having described and illustrated the principles of the invention with reference to illustrated embodiments, it will be recognized that the illustrated embodiments can be modified in arrangement and detail without departing from such principles. For example, while the foregoing description focused on operation within the Microsoft Windows NT operating system and the Microsoft Terminal Server environments, it will be recognized that the same techniques and analyses discussed above can be applied to providing other contexts having comparable limitations.

And, even though the foregoing discussion has focused on particular embodiments, it is understood that other configurations are contemplated. In particular, even though the expressions "in one embodiment" or "in another embodiment" are used herein, these phrases are meant to generally reference embodiment possibilities, and are not intended to limit the invention to those particular embodiment configurations. These terms may reference the same or different embodiments, and unless indicated otherwise, are combinable into aggregate embodiments.

Consequently, in view of the wide variety of permutations to the above-described embodiments, the detailed description is intended to be illustrative only, and should not be taken as limiting the scope of the invention. Rather, what is claimed as the invention, is all such modifications as may come within the scope and spirit of the following claims and equivalents thereto.

What is claimed is:

1. A method for unshared applications executing within a terminal server environment to interact with clients of a terminal server, wherein an application shared within the terminal server environment is executed as multiple instances on the terminal server instead of on the clients and the terminal server routes input/output for each instance to the client associated with the instance, the method comprising:

executing a second application on the terminal server to interact with a first application shared within the terminal server environment, said second application being unshared and without routing by the terminal server of input/output for the second application to the clients of the terminal server;

determining, by the second application, a session identifier for a client sharing the first application within the terminal server environment; and using the session identifier to send a message to the client instead of to the terminal server.

2. The method of claim 1, wherein the first application is unaware it is being shared.

3. The method of claim 1, further comprising:

using the session identifier to establishing an input/output communication channel with the client.

4. The method of claim 3, further comprising:

receiving over said communication channel a response to the message.

5. The method of claim 3, further comprising:

monitoring, by the second application, of accessing of resources by the first application; and determining, by the second application, an error condition arising from accessing a particular resource by the first application;

wherein the message concerns the error condition and the message is sent to the client over said communication channel.

6. The method of claim 5, wherein the second application is a virus scanner, and wherein the error condition is a virus detected in the particular resource.

7. The method of claim 1, further comprising:

monitoring, by the second application, of accessing of resources by the first application; and determining, by the second application, an error condition arising from accessing a particular resource by the first application;

wherein the message concerns the error condition.

8. The method of claim 7, wherein the second application is a virus scanner, and wherein the error condition is a virus detected in the particular resource.

9. The method of claim 7, further comprising:

starting an elapsed-time counter; and starting scanning the particular resource for viruses;

wherein said determining the error condition comprises identifying the elapsed-time counter has exceeded a scanning time-limit.

10. The method of claim 7, further comprising:

starting scanning the particular resource for viruses; and determining if the particular resource corresponds to an archive file, and if so, starting an elapsed-time counter before scanning the archive file for viruses;

wherein said determining the error condition includes determining if the elapsed-time counter exceeded a scanning time-limit.

11. A readable medium having encoded thereon instructions for allowing unshared applications executing within a terminal server environment to interact with clients of a terminal server, wherein an application shared within the terminal server environment is executed as multiple instances on the terminal server instead of on the clients and the terminal server routes input/output for each instance to the client associated with the instance, said instructions when executed capable of directing a processor to:

execute a second application on the terminal server to interact with a first application shared within the terminal server environment, said second application being unshared and without routing by the terminal server of input/output for the second application to the clients of the terminal server;

determine, by the second application, a session identifier for client sharing the first application; and use the session identifier to send a message to the client instead of to the terminal server.

12. The medium of claim 1, said instructions comprising further instructions to direct the processor to:

use the session identifier to establish an input/output communication channel with the client.

13. The medium of claim 12, said instructions comprising further instructions to direct the processor to:

receive, over said communication channel, a response to the message.

14. The medium of claim 12, said instructions comprising further instructions to direct the processor to:

monitor, by the second application, accessing of resources by the first application;

determine, by the second application, an error condition arising from accessing a particular resource by the first application;

configure the message to include the error condition; and send the message over said communication channel.

15. The medium of claim 14, wherein the second application is a virus scanner, and wherein the error condition is a virus detected in the particular resource.

16. The medium of claim 11, said instructions comprising further instructions to direct the processor to:

monitor, by the second application, of accessing of resources by the first application; and configure the message to include the error condition; and send the message over said communication channel.

17. The medium of claim 16, wherein the second application is a virus scanner, and wherein the error condition is a virus detected in the particular resource.

18. The medium of claim 16, said instructions comprising further instructions to direct the processor to:

start an elapsed-time counter; and start scanning the particular resource for viruses;

wherein said instructions for determining the error condition further comprise instructions for determining that the elapsed-time counter has exceeded a scanning time-limit.

19. The medium of claim 16, said instructions comprising further instructions to direct the processor to:

start scanning the particular resource for viruses; and determine if the particular resource corresponds to an archive file, and if so, starting an elapsed-time counter before scanning the archive file for viruses;

wherein said instructions for determining the error condition further comprise instructions for determining that the elapsed-time counter has exceeded a scanning time-limit.

20. A system for unshared applications executing within a terminal server environment to interact with clients of a terminal server, wherein an application shared within the terminal server environment is executed as multiple instances on the terminal server instead of on the clients and the terminal server routes input/output for each instance to the client associated with the instance, the system comprising:

a file access monitor for monitoring file accesses by a first application shared within the terminal server environment;

a virus scanning arrangement executing on the server for scanning accessed files for viruses;

a timer arrangement for timing said scanning accessed files for viruses;

a scan-termination arrangement for interrupting the virus scanning arrangement if said scanning accessed files for viruses does not complete within a timeout period;

means for determining, by the virus scanning arrangement, a session identifier for a client sharing the first application; and means for sending a message, to the client according to the session identifier instead of to the terminal server, indicating said scanning accessed files for viruses timed out.

* * * * *